United States Patent
Schärer et al.

(10) Patent No.: US 9,062,420 B2
(45) Date of Patent: Jun. 23, 2015

(54) UNBALANCE TYPE EXCITER FOR A SOIL COMPACTION DEVICE

(75) Inventors: Martin Schärer, Herzogenbuchsee (CH); Christoph Anliker, Langenthal (CH)

(73) Assignee: Ammann Schweiz AG, Langenthal (CH)

( * ) Notice: Subject to any disclaimer, the term of this patent is extended or adjusted under 35 U.S.C. 154(b) by 0 days.

(21) Appl. No.: 14/131,775

(22) PCT Filed: Jul. 15, 2011

(86) PCT No.: PCT/CH2011/000166
§ 371 (c)(1),
(2), (4) Date: Feb. 11, 2014

(87) PCT Pub. No.: WO2013/010277
PCT Pub. Date: Jan. 24, 2013

(65) Prior Publication Data
US 2014/0161531 A1    Jun. 12, 2014

(51) Int. Cl.
*E01C 19/28* (2006.01)
*E02D 3/074* (2006.01)
*G01V 1/153* (2006.01)

(52) U.S. Cl.
CPC .............. *E01C 19/286* (2013.01); *E02D 3/074* (2013.01); *G01V 1/153* (2013.01)

(58) Field of Classification Search
CPC ........ E01C 19/28; E01C 19/286; E01D 3/074
USPC .............................. 404/113, 117, 122; 73/594
See application file for complete search history.

(56) References Cited

U.S. PATENT DOCUMENTS

| | | | | |
|---|---|---|---|---|
| 5,248,216 A * | 9/1993 | Vural | .............. | 404/75 |
| 5,397,198 A * | 3/1995 | Bertrand | .............. | 404/117 |
| 5,934,824 A * | 8/1999 | Vural | .............. | 404/117 |
| 7,066,681 B2 * | 6/2006 | Paske | .............. | 404/117 |
| 8,556,039 B2 * | 10/2013 | Marsolek et al. | .............. | 184/6.12 |
| 2003/0082001 A1 * | 5/2003 | Potts | .............. | 404/117 |
| 2004/0120767 A1 * | 6/2004 | Potts et al. | .............. | 404/117 |
| 2006/0034659 A1 * | 2/2006 | Magee | .............. | 404/117 |

FOREIGN PATENT DOCUMENTS

| | | |
|---|---|---|
| DE | 202006004707 | 6/2006 |
| DE | 102008008802 A1 | 8/2009 |
| WO | 0242011 A1 | 5/2002 |

OTHER PUBLICATIONS

International search report for PCT/CH2011/000166 dated Jul. 10, 2012.

* cited by examiner

*Primary Examiner* — Raymond W Addie
(74) *Attorney, Agent, or Firm* — McCormick, Paulding & Huber LLP

(57) ABSTRACT

The invention relates to an unbalance type exciter (6) for a soil compaction device. This exciter comprises a carrying structure (5) as well as an unbalance weight (8, 9), which by means of a bearing (11a, 11b) is supported at the carrying structure (5) in rotatable manner around a rotation axis (Y) which in the intended use is stationary with respect to the carrying structure (5), for generating an intermittent exciting force for causing the carrying structure (5) in the intended use to vibrate. The bearing (11a, 11b) of the unbalance weight (8, 9) is arranged at least partially within the space which is circled by the unbalance weight (8, 9) when rotating around the rotation axis (y). Owing to the fact that this space is used for receiving at least part of the bearing of the unbalance weight (8, 9) it becomes possible to provide unbalance type exciters (6) having very small axial overall length.

20 Claims, 3 Drawing Sheets

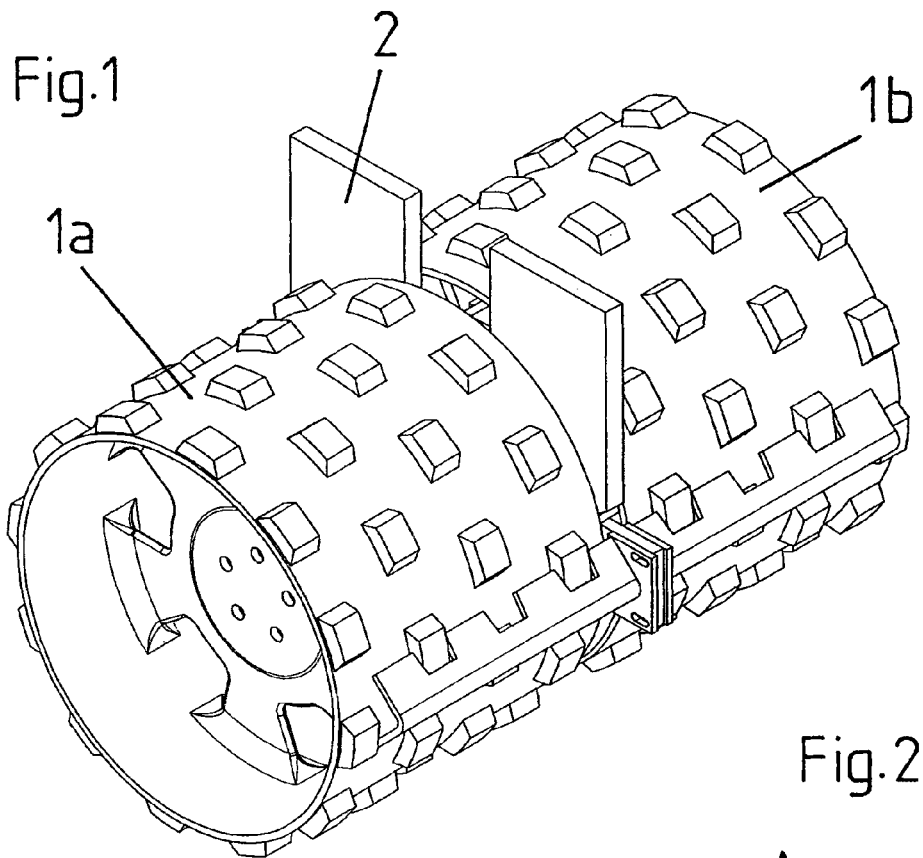
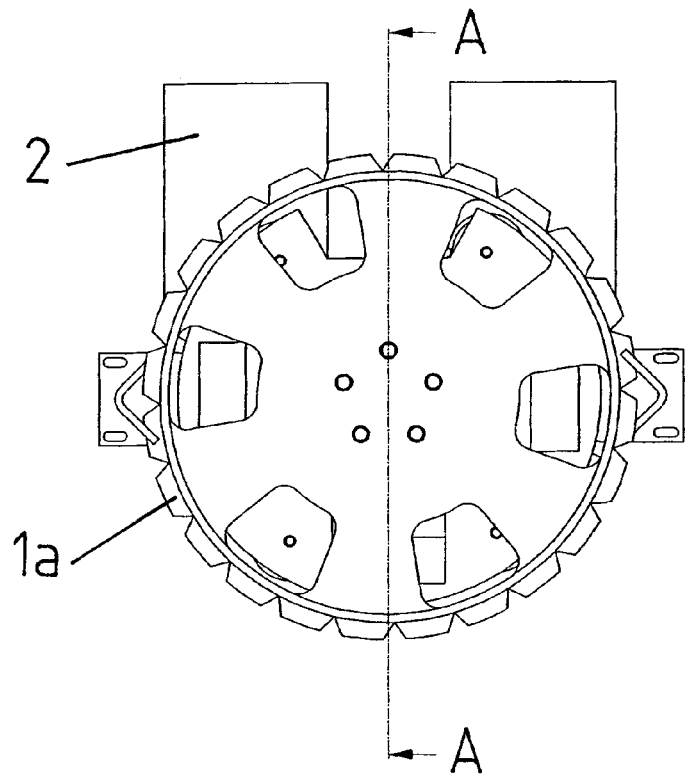

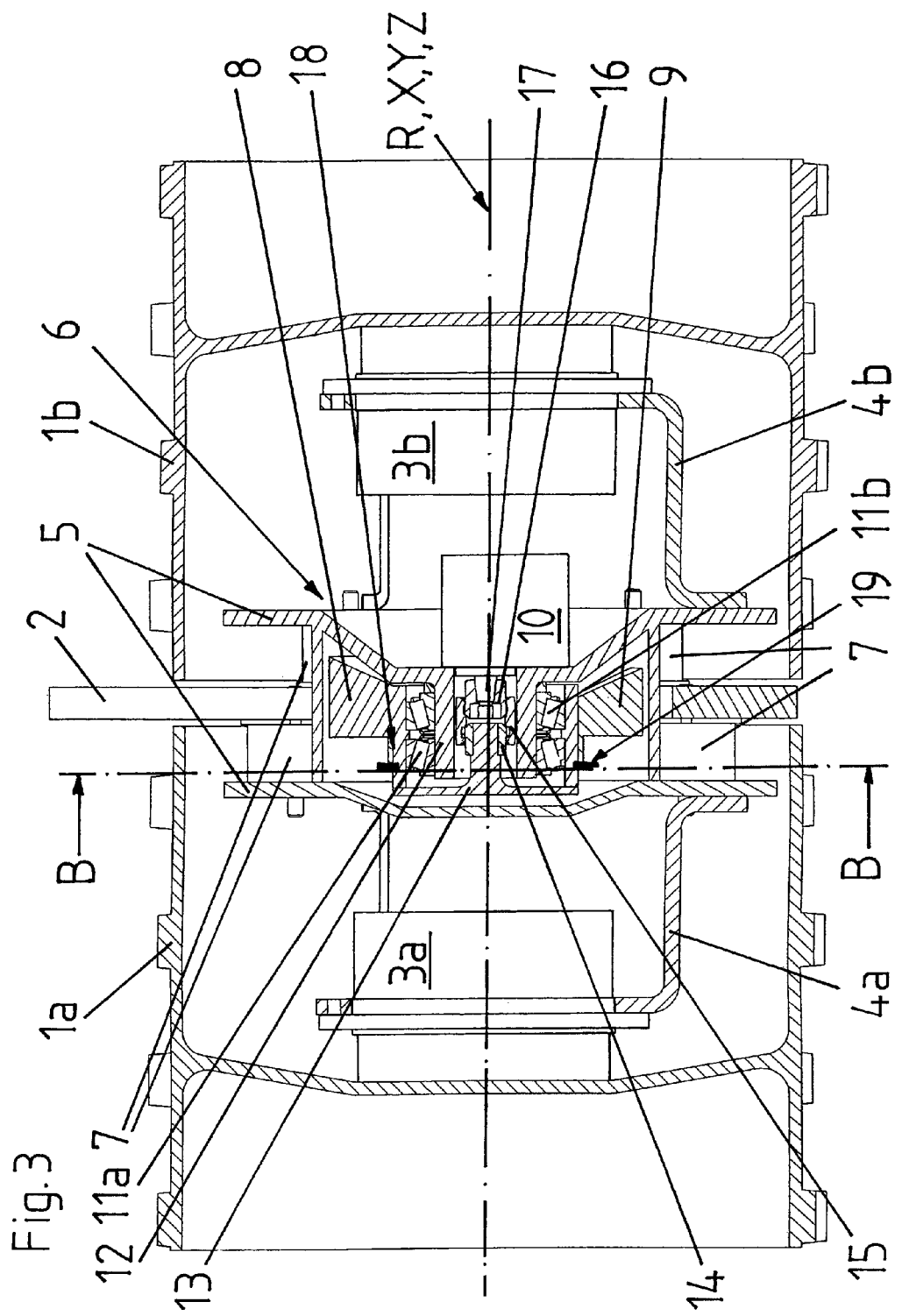

UNBALANCE TYPE EXCITER FOR A SOIL COMPACTION DEVICE

CROSS REFERENCE TO RELATED APPLICATIONS

This application claims the priority of PCT Application No. PCT/CH2011/000166, filed on Jul. 15, 2011, the disclosure of which is incorporated herein by reference in its entirety.

TECHNICAL FIELD

The invention concerns an unbalance type exciter for a soil compacting device, a roller arrangement comprising the unbalance type exciter as well as a vibratory roller comprising the roller arrangement according to the preambles of the independent claims.

BACKGROUND OF THE INVENTION

Unbalance type exciter serve for generating exciting forces changing over time, by means of which components coupled to the exciter can be caused to vibrate. They are employed in many technical fields, e.g. in vibrating conveyors, in vibrating screens, in compacting devices like e.g. vibratory plates or vibratory rollers, in vibratory pile driving devices and in vibration excited drilling and cutting devices.

For generating the exciting forces, depending on the design concept, one or more shafts, at which unbalance weights are arranged, are put into rotation.

In vibratory rollers it is preferred to arrange the unbalance type exciter within the roller drum and to decouple the rest of the machine with respect to vibrations in order to keep the vibrating masses and therewith the energy requirement as low as possible.

However, especially in case of relative narrow soil compacting devices like trench rollers, there is the problem that the unbalance type exciters known today, when providing a suitable exciting power comprise an overall length which makes it difficult or even impossible to arrange them axial in line with the roller drive in the rotational centre of the roller, what is desirable since in that case the starting point of the exciting forces substantially coincides with the centre of mass of the roller arrangement formed in this way so that an optimal vibration behaviour of the rollers can be achieved and the remaining structure of the machine is exposed only to minor additional load due to the exciting forces.

Hence, it is an object of the invention to provide an unbalance type exciter for soil compaction devices which has a substantially reduced overall length compared to known unbalance type exciters.

This object is achieved by the present invention.

SUMMARY OF THE INVENTION

Accordingly, a first aspect of the invention concerns an unbalance type exciter for a soil compaction device. The unbalance type exciter comprises a carrying structure, at which an unbalance weight by means of a bearing is supported in a rotatable manner around a rotation axis which in the intended use is stationary with respect to the carrying structure, for generating of an intermittent exciting force by means of which the carrying structure in the intended use can be caused to vibrate. The bearing of the unbalance weight is completely or partially arranged within the space, which is circled by the unbalance weight during its rotation about the rotation axis, or, in other words, which is enclosed by the flight path of the unbalance weight. Owing to the fact that this space is used for receiving at least part of the bearing of the unbalance weight or of the rotatable component carrying the unbalance weight, respectively, it becomes possible to provide unbalance type exciters having very small axial overall length.

In case the bearing of the unbalance weight or of the rotatable component carrying the unbalance weight, respectively, is completely arranged within the space which is circled by the unbalance weight during its rotation about the rotation axis, what is preferred, no additional axial space is required for this bearing.

In a preferred embodiment, the unbalance type exciter comprises coupling means for coupling the unbalance weight or the rotatable component carrying the unbalance weight, respectively, to a drive motor for rotating the unbalance weight about the rotating axis. The coupling means comprise a coupling member for coupling to the drive motor, e.g. a coupling flange or a coupling toothwork, which coupling member is partially or completely arranged within the space which is circled by the unbalance weight during its rotation about the rotation axis. By this, the advantage is arrived at that for coupling of the drive motor no additional axial space is required.

If the unbalance type exciter comprises a drive motor for rotating the unbalance weight, what is preferred since in that case it is an assembly which is ready for use and for use merely has to be connected to a power supply for the drive motor, it is furthermore preferred that the drive shaft of the drive motor is partially or completely arranged within the space, which is circled by the unbalance weight during its rotation about the rotation axis. Also by this measure axial overall length can additionally be saved.

Preferably, the rotational axis of the unbalance weight and of the drive motor coincide, resulting in the advantage that a quite simple coupling of the drive motor without additional parts which are moveable relative to each other becomes possible, which promotes a cost efficient and sturdy construction of the unbalance type exciter.

In a further preferred embodiment, the unbalance type exciter comprises a first and a second unbalance weight. Both unbalance weights, for generating the intermittent exciting force, are rotatable around a common rotation axis and optionally can be positioned relative to each other in such a manner that in a first relative position the respective exciting forces generated by the two unbalance weights when rotating them in the intended manner at least partially add up and in a second relative position at least partially subtract from each other. By this it becomes possible to optionally provide a smaller or a bigger resulting overall unbalance for generating the intermittent exciting force, for generating exciting forces of different magnitude.

Preferably, in that case the second unbalance weight by means of a bearing is mounted freely rotatable over a certain range of angle of rotation around the common rotation axis of the unbalance weights, so that a change between the first and the second relative position can in a simple manner be effected by reversing the direction of rotation of the unbalance weights.

In such embodiments of the unbalance type exciter it is of advantage that the bearing of the second unbalance weight partially or completely is arranged within the space which is circled by the first unbalance weight during its rotation about the rotation axis or which is utilized by the first unbalance weight during its rotation about the rotation axis. By this, for the bearing of the second unbalance weight no or relative little additional axial space is required.

Also it is of advantage in such embodiments of the unbalance type exciter that the second unbalance weight during its rotation about the rotation axis is partially or completely arranged within the space which is circled by the first unbalance weight during its rotation about the rotation axis or which is utilized by the first unbalance weight during its rotation about the rotation axis. Through this, no or relative little additional axial space is required for the flight path of the second unbalance weight.

In further preferred embodiments, the unbalance type exciter is designed as circular oscillator or as directional oscillator. In the first mentioned case especially cost effective constructions are possible, since merely one unbalance weight rotating about a rotation axis is required. In the last mentioned case the advantage is arrived at that the effective direction of the exciting force can specifically be tailored to the particular application.

A second aspect of the invention concerns a roller arrangement for a vibratory roller having one or several unbalance type exciter according to the first aspect of the invention.

The roller arrangement comprises at least one roller, which by means of a bearing is supported in a rotatable manner, and at least one drive motor for rotating this roller in the intended use of the roller arrangement. The drive motor for rotating the roller is substantially, i.e. with the bigger part of its physical extent or completely, arranged within the roller.

The unbalance type exciter comprises a drive motor for causing the roller in the intended use to vibrate through a rotation of its unbalance weight or unbalance weights. The drive motor is substantially, i.e. with the bigger part of its physical extent or completely, arranged within the roller.

The roller arrangement further comprises a connecting element for connecting the roller arrangement to a chassis of a vibratory roller to be formed with it. The connecting element, for making possible the connecting of the roller arrangement to the chassis, radially protrudes over the outer boundaries of the at least one roller and within the at least one roller is connected with the bearing of the roller and with the carrying structure of the unbalance type exciter in such a manner that the chassis of a vibratory roller formed with the roller arrangement in the intended use can be supported via the connecting element on the at least one roller which is caused to vibrate.

In such roller arrangements the advantages of the invention become especially clearly apparent.

In a preferred embodiment of the roller arrangement, the at least one drive motor of the at least one roller and the at least one drive motor of the at least one unbalance type exciter or the mass centres of these drive motors, respectively, are arranged substantially in the centre of the at least one roller. By this, the advantage is arrived at that the starting point of the exciting forces substantially coincides with the centre of mass of the so formed roller arrangement, whereby an optimal vibration behaviour of the rollers can be achieved and the remaining structure of the machine is exposed only to minor additional load due to the exciting forces.

Preferably, in that case the rotation axis of the drive motor of the at least one roller and/or of the drive motor of the at least one unbalance type exciter coincide with the rotation axis of the at least one roller. By means of this, in particular in embodiments of the roller arrangement in which the at least one unbalance type exciter is designed as circular oscillator, the advantage is arrived at that a distinct circular vibrational movement of the roller can be achieved.

In a further preferred embodiment of the roller arrangement, between the connecting element and the carrying structure of the at least one unbalance type exciter there are arranged vibration damping means, preferably rubber mounting elements, for decoupling the connecting element with respect to vibrations from the at least one unbalance type exciter. By means of this it is possible to directly connect the connecting element without further vibration damping measures to the chassis of a vibratory roller to be formed therewith.

In still a further preferred embodiment of the roller arrangement the bearing of the at least one roller in a rigid manner is connected to the carrying structure of the at least one unbalance type exciter, so that the bearing and with it the at least one roller in the intended use are caused to vibrate by the unbalance type exciter. Through this, relative simple designed and therewith cost effective constructions become possible.

In still a further preferred embodiment of the roller arrangement, the at least one roller comprises two rollers, which by its bearings are supported in such a manner that their rotation axis intersect (e.g. in case of cone-shaped rollers) or coincide (e.g. in case of cylindrical rollers of identical diameters). In that embodiment it is further preferred that each of the two rollers comprises its own drive motor, by means of which it can be driven independently of the other roller. Through this it becomes possible to steer a vibrating roller to be formed with the roller arrangement by differently driving the rollers.

In case in this embodiment the connecting element radially protrudes between the two rollers over the outer boundaries of the rollers and the ends of the two rollers which are facing away from the connecting element form the axial boundaries of the roller arrangement, what is preferred, trench rollers can be formed with the roller arrangement, which due to the requirement of a small width particularly benefit from the advantages of the invention.

In embodiments of the roller arrangement which have two rollers it is also preferred that the roller arrangement comprises exactly one unbalance type exciter, by means of which both rollers can commonly be caused to vibrate. Through this, especially compact roller arrangements according to the invention can be provided in a cost effective manner.

A third aspect of the invention concerns a vibrating roller, preferably for soil compaction, having a roller arrangement according to the second aspect of the invention. In such vibrating rollers, in particular in the form of two-axle trench rollers, the advantages of the invention especially clearly become apparent.

BRIEF DESCRIPTION OF THE DRAWINGS

Further embodiments, advantages and applications of the invention become apparent from the dependent claims and from the following description based on the Figures.

FIG. 1 is a perspective view from above onto a roller arrangement according to the invention;

FIG. 2 is a side view of the roller arrangement of FIG. 1;

FIG. 3 is a section through the roller arrangement of FIG. 1 along Line A-A in FIG. 2.

DESCRIPTION OF THE PREFERRED EMBODIMENTS

Figure 4:
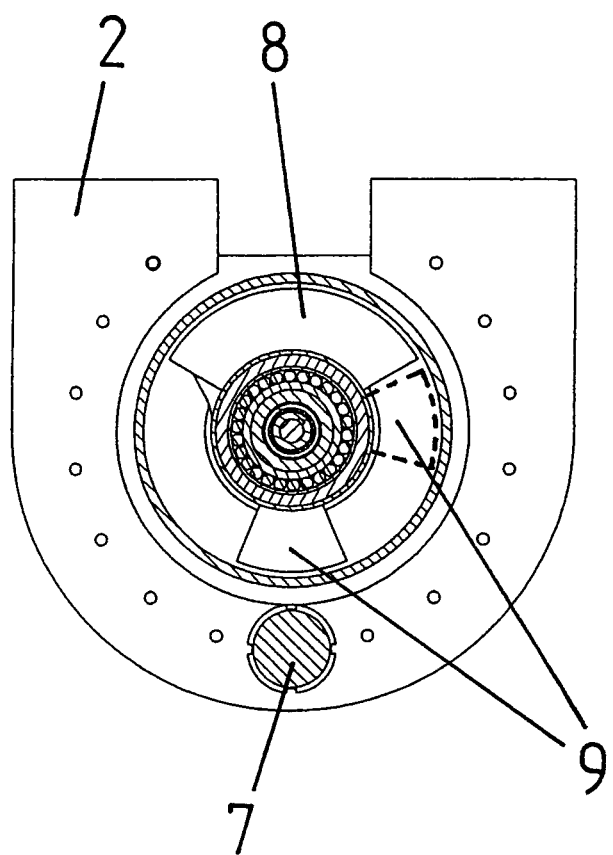
FIG. 4 is a section through the roller arrangement of FIG. 1 along Line B-B in FIG. 3.

FIG. 1 shows a roller arrangement according to the invention for a vibration excited trench roller in a perspective top view. The roller arrangement comprises two nubby rollers 1a, 1b of identical diameter, which are arranged side by side with coinciding rotation axis X, and a connecting element 2 for connecting the roller arrangement to the chassis of a trench roller to be formed therewith.

The connection element 2 radially protrudes between the two rollers 1a, 1b over the outer boundaries of the rollers 1a, 1b and within the rollers 1a, 1b is connected to them in such a manner that the rollers 1a, 1b can be rotated about their rotation axis X relative to the connecting element 2 and the chassis of the trench roller to be formed with the roller arrangement can be supported via the connecting element 2 on the rollers 1a, 1b. The ends of the rollers 1a, 1b which are facing away from the connecting element 2 form the axial boundaries of the roller arrangement.

As can be seen in combination with FIG. 2, which shows a side view of the roller arrangement, and with FIG. 3, which shows a vertical longitudinal section through the roller arrangement, each of the rollers 1a, 1b has its own hydraulic motor 3a, 3b for driving it, which is arranged in the centre of the roller 1a, 1b that is driven by it and moreover forms the bearing of this roller 1a, 1b.

The motors 3a, 3b for driving the rollers 1a, 1b in each case, via a supporting dome 4a, 4b which is open against upwards, are connected in a with regard to vibrations rigid manner with the housing 5 of an unbalance type exciter 6 according to the invention, which is arranged within the two rollers 1a, 1b and the connecting element 2, so that they together with the rollers 1a, 1b which are supported by them can commonly be caused to vibrate by this unbalance type exciter 6.

The housing 5 of the unbalance type exciter 6 is mounted to the connecting element 2 by means of rubber mounting elements 7, so that the connecting element 2 can be supported via the unbalance type exciter 6 on the rollers 1a, 1b while with respect to vibrations it is decoupled from same and from the rollers 1a, 1b which can be caused by same to vibrate.

The unbalance type exciter 6 is designed as a circular oscillator and comprises a first unbalance weight 8 and a second unbalance weight 9, which are supported at the housing 5 (carrying structure according to the claims of the unbalance type exciter according to the invention) in a rotatable manner about a common rotation axis Y and by means of a dedicated hydraulic drive motor 10 can be rotated, for generating an intermittent exciting force by means of which in the intended use the housing 5 and the rollers 1a, 1b, which are supported at it via the supporting domes 4a, 4b and the motors 3a, 3b, can be caused to vibrate. The common rotation axis Y of the unbalance weights 8, 9 and the rotation axis Z of the drive motor 10 coincide with the rotation axis R of the hydraulic motors 3a, 3b and the rotation axis X of the rollers 1a, 1b.

The first unbalance weight 8 is supported in the centre of the housing 5 on a pipe stub like extension 12 by means of two rolling bearings 11a, 11b. The right rolling bearing 11b is arranged within the space which in the intended use is circled by the unbalance weights 8, 9 when rotating.

The component forming the first unbalance weight 8 is coupled via a coupling element 13 with a pinion 14, which coupling element axially penetrates into the pipe stub like extension 12, a coupling sleeve 15 with internal toothing and a further pinion 16 (coupling means according to the claims) in an axial play tolerant but rotational positive manner within the pipe stub like extension 12 to the shaft 17 of the drive motor 10. In doing so, the coupling sleeve 15, the further pinion 16 and a part of the shaft 17 of the drive motor 10 are located within the space which is circled by the first unbalance weight 8 when rotating in the intended use.

As can best be recognized in combination with FIG. 4, which shows a section through the roller arrangement of FIG. 1 along line B-B in FIG. 3 (the rollers 1a, 1b and the upper rubber mounting elements 7 are not illustrated), the second unbalance weight 9 by means of a friction bearing 18 is mounted, freely rotatable with respect to the first unbalance weight 8 between two limit stops (not illustrated), to the component forming the first unbalance weight 8 and during its rotation about the common rotation axis Y is completely arranged within the space which is utilized by the first unbalance weight 8 when rotating. In doing so, a part of its friction bearing 18 is arranged within the space which is circled by the unbalance weights 8, 9 during their rotation about the rotation axis Y. Axially, the second unbalance weight 9 is positioned between the first unbalance weight 8 and a retaining ring 19.

Due to the fact that the second unbalance weight 9 is freely rotatable with respect to the first unbalance weight 8 between the limit stops, it is possible to position the unbalance weights 8, 9 by reversing the rotation direction of the drive motor 10 selectively in such a manner relative to each other that in a first relative position (see the position of the second unbalance weight 9 depicted in FIG. 4 in dotted lines) the exciting forces generated by the two unbalance weights 8, 9 when rotating them in the intended manner at least partially add up and in a second relative position (see the position of the second unbalance weight 9 depicted in FIG. 4 in continuous lines) at least partially subtract from each other. By this it becomes possible to provide with the unbalance type exciter, depending on the direction of rotation of the motor 10, exciting forces of different magnitude.

While there are described in the present patent application preferred embodiments of the invention it is to be distinctly understood that the invention is not limited thereto but may be otherwise variously embodied and practised within the scope of the following claims.

What is claimed is:

1. Unbalance type exciter for a soil compaction device, comprising
    a) a carrying structure and
    b) an unbalance weight, which by means of a bearing is supported at the carrying structure in rotatable manner around a rotation axis (Y), which rotation axis in the intended use is stationary with respect to the carrying structure, for generating an intermittent exciting force for causing the carrying structure in the intended use to vibrate,
wherein the bearing of the unbalance weight is arranged at least partially within the space which is circled by the unbalance weight when rotating around the rotation axis (Y).

2. Unbalance type exciter according to claim 1, wherein the bearing is completely arranged within the space which is circled by the unbalance weight when rotating around the rotation axis (Y).

3. Unbalance type exciter according to claim 1, further comprising coupling means for coupling the unbalance weight to a drive motor for rotating the unbalance weight around the rotation axis (Y), wherein the coupling means comprise a coupling member for coupling to the drive motor, in particular a coupling flange or a coupling toothwork, which partially or completely is arranged within the space which is circled by the unbalance weight when rotating around the rotation axis (Y).

4. Unbalance type exciter according to claim 1, further comprising a drive motor for rotating the unbalance weight.

5. Unbalance type exciter according to claim 3, wherein a drive motor is included for rotating the unbalanced weight, the drive motor via the coupling member is coupled to the coupling means and wherein the drive shaft of the drive motor is partially or completely arranged within the space which is circled by the unbalance weight when rotating around the rotation axis (Y).

6. Unbalance type exciter according to claim 4, wherein the rotation axis (Y) of the unbalance weight and the rotation axis (Z) of the drive motor coincide with each other.

7. Unbalance type exciter according to claim 1, wherein the exciter comprises a first unbalance weight and a second unbalance weight, which unbalance weights for generating the intermittent exciting force are rotatable around a common rotation axis (Y) and optionally can be positioned relative to each other in such a manner that in a first relative position the exciting forces generated by the two unbalance weights when rotating them in the intended manner at least partially add up and in a second relative position at least partially subtract from each other.

8. Unbalance type exciter according to claim 7, wherein the second unbalance weight by means of a bearing is mounted freely rotatable over a certain range of angle of rotation around the common rotation axis (Y) of the unbalance weights, so that a change between the first and the second relative position can be effected by reversing the direction of rotation of the unbalance weights.

9. Unbalance type exciter according to claim 8, wherein the bearing of the second unbalance weight partially or completely is arranged within the space which is circled by the first unbalance weight when rotating around the rotation axis (Y) or which is utilized by the first unbalance weight when rotating around the rotation axis (Y).

10. Unbalance type exciter according to claim 6, wherein the second unbalance weight when rotating around the rotation axis (y) is partially or completely arranged within the space which is utilized by the first unbalance weight when rotating around the rotation axis (Y).

11. Unbalance type exciter according to claim 1, wherein the unbalance type exciter is designed as circular oscillator or as directional oscillator.

12. Roller arrangement for a vibratory roller, comprising:
a) at least one roller which by means of a bearing is supported in a rotatable manner,
b) at least one drive motor for rotating the at least one roller (1a, 1b) in the intended use of the roller arrangement, wherein the at least one drive motor (3a, 3b) is arranged substantially within the at least one roller (1a, 1b),
c) at least one unbalance type exciter having a bearing supporting an unbalanced weight for rotation about an axis of rotation with the bearing arranged at least partially within the space circled by the unbalanced weight, and also having a drive motor for rotating the unbalance weight of the unbalance type exciter for causing the roller in the intended use to vibrate, wherein the at least one unbalance type exciter and its drive motor are substantially arranged within the at least one roller, and
d) a connecting element for connecting the roller arrangement to a chassis of a vibratory roller to be formed therewith, wherein the connecting element radially protrudes over the outer boundaries of the at least one roller and within the at least one roller is connected with the bearing of the roller and with the carrying structure of the unbalance type exciter in such a manner that the chassis of a vibratory roller formed with the roller arrangement in the intended use can be supported via the connecting element on the at least one roller which is caused to vibrate.

13. Roller arrangement according to claim 12, wherein the at least one drive motor of the at least one roller and the drive motor of the at least one unbalance type exciter are arranged substantially in the centre of the at least one roller, and in particular the rotation axis (R) of the at least one drive motor of the at least one roller and/or the rotation axis (Z) of the drive motor of the at least one unbalance type exciter coincide with the rotation axis (X) of the at least one roller.

14. Roller arrangement according to claim 12, wherein the at least one unbalance type exciter is designed as circular oscillator and the rotation axis (Y, X) of the unbalance weight or unbalance weights of the at least one unbalance type exciter and of the at least one roller coincide.

15. Roller arrangement according to claim 12, wherein between the connecting element and the carrying structure of the at least one unbalance type exciter vibration damping means are arranged, in particular rubber mounting elements, for decoupling the connecting element from the at least one unbalance type exciter with respect to vibrations.

16. Roller arrangement according to claim 12, wherein the bearing of the at least one roller in a rigid manner is connected to the carrying structure of the at least one unbalance type exciter, so that the bearing of the roller and with it the roller in the intended use are caused to vibrate by the unbalance type exciter.

17. Roller arrangement according to claim 12, wherein the at least one roller comprises two rollers, which by its bearings are supported in such a manner that their rotation axis (X) intersect or coincide, and in particular, wherein each of the two rollers comprises its own drive motor, by means of which it can be driven independently of the other roller.

18. Roller arrangement according to claim 17, wherein the roller arrangement comprises exactly one unbalance type exciter by means of which both rollers can commonly be caused to vibrate.

19. Roller arrangement according claim 17, wherein the connecting element between the two rollers radially protrudes over the outer boundaries of the rollers and the ends of the two rollers which are facing away from the connecting element form the axial boundaries of the roller arrangement.

20. Vibratory roller for soil compaction, comprising a roller arrangement according to claim 12.

* * * * *